US008464184B1

(12) United States Patent
Cook et al.

(10) Patent No.: US 8,464,184 B1
(45) Date of Patent: Jun. 11, 2013

(54) SYSTEMS AND METHODS FOR GESTURE-BASED DISTRIBUTION OF FILES

(75) Inventors: Randall R. Cook, Mapleton, UT (US); Paul Mackay, Provo, UT (US)

(73) Assignee: Symantec Corporation, Mountain View, CA (US)

( * ) Notice: Subject to any disclaimer, the term of this patent is extended or adjusted under 35 U.S.C. 154(b) by 148 days.

(21) Appl. No.: 12/956,541

(22) Filed: Nov. 30, 2010

(51) Int. Cl.
*G06F 3/033* (2006.01)
*G06F 3/048* (2006.01)
*G06F 17/00* (2006.01)
*G06F 15/157* (2006.01)

(52) U.S. Cl.
USPC ............... 715/863; 715/769; 726/1; 709/213

(58) Field of Classification Search
USPC ............... 715/769, 863; 726/1; 709/212, 213, 709/219
See application file for complete search history.

(56) References Cited

U.S. PATENT DOCUMENTS

| | | | | |
|---|---|---|---|---|
| 5,801,700 | A * | 9/1998 | Ferguson | 715/748 |
| 6,970,871 | B1 * | 11/2005 | Rayburn | 1/1 |
| 2002/0198944 | A1 * | 12/2002 | Moss | 709/206 |
| 2003/0008659 | A1 * | 1/2003 | Waters et al. | 455/456 |
| 2003/0220835 | A1 * | 11/2003 | Barnes, Jr. | 705/14 |
| 2007/0146347 | A1 | 6/2007 | Rosenberg | |
| 2008/0039212 | A1 * | 2/2008 | Ahlgren et al. | 463/46 |
| 2008/0066150 | A1 * | 3/2008 | Lim | 726/1 |
| 2008/0096654 | A1 * | 4/2008 | Mondesir et al. | 463/31 |
| 2008/0152263 | A1 * | 6/2008 | Harrison | 382/313 |
| 2008/0307489 | A1 * | 12/2008 | Hubbard | 726/1 |
| 2009/0017799 | A1 * | 1/2009 | Thorn | 455/414.1 |
| 2009/0244015 | A1 * | 10/2009 | Sengupta et al. | 345/173 |
| 2009/0296991 | A1 | 12/2009 | Anxola | |
| 2011/0083111 | A1 * | 4/2011 | Forutanpour et al. | 715/863 |
| 2011/0163944 | A1 * | 7/2011 | Bilbrey et al. | 345/156 |
| 2011/0175822 | A1 * | 7/2011 | Poon et al. | 345/173 |

OTHER PUBLICATIONS

Microsoft Computer Dictionary, Microsoft Press, Mar. 15, 2002.*
Far East Gizmos, Literally flick media files wirelessly; http://www.fareastgizmos.com/mobile_phones/lg_optimus_7_allows_users_to_literally_flick_media_files_wirelessly_to_their_tv_or_home_theater_system.php; Taken from site on Sep. 23, 2010.
Farhan Siddiqui et al.,A dynamic network discovery and selection method for heterogeneous wireless networks; http://inderscience.metapress.com/app/home/contribution.asp?referrer=parent&backto=issue,3,6;journal,4,15;linkingpublicationresults,1:119744,1; Taken from site on Sep. 23, 2010.

(Continued)

*Primary Examiner* — Tadeese Hailu
*Assistant Examiner* — Nicholas Ulrich
(74) *Attorney, Agent, or Firm* — ALG Intellectual Property, LLC

(57) ABSTRACT

A method for gesture-based distribution of files may include 1) receiving, at a first computing device, input that identifies a file for gesture-based distribution to one or more other computing devices; 2) detecting a plurality of additional computing devices in physical proximity of the first computing device; 3) for each computing device in the plurality of additional computing devices, determining a physical location of the additional computing device; 4) detecting, on the first computing device, a gesture of a user of the first computing device; 5) determining, based on one or more of the physical locations of the additional computing devices, that the gesture of the user was directed toward one or more of the additional computing devices; 6) distributing the file to the one or more additional computing devices toward which the user gestured. Various other methods, systems, and computer-readable media are also disclosed.

20 Claims, 8 Drawing Sheets

OTHER PUBLICATIONS

Farhan Siddiqui et al.; An efficient wireless network discovery scheme for heterogeneous access environments; http://www.emeraldinsight.com/journals.htm?articleid=1724265&show=html; Taken from site on Sep. 23, 2010.

Trevor Pering et al.; Gesture Connect: Facilitating Tangible Interaction With a Flick of the Wrist; Proceedings of the 1st International Conference on Tangible and Embedded Interaction; 2007; pp. 259-262; http://www.google.com/url?sa=t&source=web&cd=2&ved=0CBYQFjAB&url=http%3A%2F%2Fciteseerx.ist.psu.edu%2Fviewdoc%2Fdownload%3Fdoi%3D10.1.1.101.4907%26rep%3Drep1%26type 3Dpdf&ei=OCBrTK6OHJTY9ATY9NmWDw&usg=AFQjCNFke3aGy1hFRrA88uCuyDvBLi5TrA&sig2=KnIRzPmygPQ1q XmNO7F4WQ.

Jon Adams; Animating Your World with a Flick of the Wrist; http://blogs.freescale.com/2010/04/06/animating-your-world-with-a-flick-of-the-wrist/; Taken from site on Apr. 6, 2010.

\* cited by examiner

SYSTEMS AND METHODS FOR GESTURE-BASED DISTRIBUTION OF FILES

BACKGROUND

Mobile devices have become ubiquitous in day-to-day business and personal life. People use mobile devices, such as cell phones, laptops, tablet devices, and a variety of other devices to manage work schedules, send and receive emails, share media, and generally stay connected to one another. Unfortunately, despite rapid advancement of mobile technologies, file sharing among mobile devices can still be cumbersome. For example, during a presentation a presenter may want to send a document to one or more people listening to the presentation. To send the document, the user may need to stop the lecture, gather email addresses of recipients, and send the document via email (or another electronic communication mechanism). This traditional process of distributing files may be disruptive in lectures, conferences, classrooms, and a variety of other situations. What is needed, therefore, is a more efficient and effective mechanism for distributing files among computing devices.

SUMMARY

As will be described in greater detail below, the instant disclosure generally relates to systems and methods for gesture-based distribution of files. Embodiments of the instant disclosure may detect computing devices that are in physical proximity of a first computing device and may enable a user to distribute a file from the first computing device to a remote device by simply gesturing toward the remote device.

For example, a method for gesture-based distribution of files may include 1) receiving, at a first computing device, input that identifies a file for gesture-based distribution to one or more other computing devices; 2) detecting a plurality of additional computing devices in physical proximity (e.g., in the same room) of the first computing device; 3) for each computing device in the plurality of additional computing devices, determining a physical location (e.g., GPS coordinates, relative physical location, etc.) of the additional computing device; 4) detecting, on the first computing device, a gesture of a user of the first computing device; 5) determining, based on one or more of the physical locations of the additional computing devices, that the gesture of the user was directed toward one or more of the additional computing devices; and 6) distributing the file to the one or more additional computing devices toward which the user gestured.

In some embodiments, the method may also include displaying, on a graphical user interface of the first computing device, a graphical representation of each of the additional computing devices. The graphical representations of the additional computing devices may be displayed on the graphical user interface in a configuration that represents the physical locations of the additional computing devices. In such embodiments, determining that the gesture of the user was directed toward one or more of the additional computing devices may include determining that the gesture dragged a graphical representation of the file toward one or more graphical representations of the one or more additional computing devices.

Additionally or alternatively, determining that the gesture of the user was directed toward one or more of the additional computing devices may include determining that the user flicked a graphical user interface of the first device in a direction of the one or more additional computing devices and/or determining that the user moved the first device toward the one or more additional computing devices (e.g., determining that the user flicked the first computing device from a position pointing away from the one or more additional computing devices to a position pointing toward the one or more additional computing devices).

According to various embodiments, determining that the gesture of the user was directed toward one or more of the additional computing devices may include determining that the user performed a sweeping motion in the direction of the additional computing devices, and distributing the file to the one or more additional computing devices toward which the user gestured may include distributing the file to each of the additional computing devices.

In at least one embodiment, the method may include identifying a distribution policy that defines at least one condition that must be met for gesture-based distribution of the file to be allowed and determining whether the distribution policy allows the file to be distributed to the one or more additional computing devices by determining whether the condition defined by the distribution policy has been met.

According to certain embodiments, a system for gesture-based distribution of files may include: 1) a file-identification module programmed to receive, at a first computing device, input that identifies a file for gesture-based distribution to one or more other computing devices; 2) a proximity-detection module programmed to detect a plurality of additional computing devices in physical proximity of the first computing device and, for each computing device in the plurality of additional computing devices, determine a physical location of the additional computing device; 3) a gesture-detection module programmed to detect, on the first computing device, a gesture of a user of the first computing device and to determine, based on one or more of the physical locations of the additional computing devices, that the gesture of the user was directed toward one or more of the additional computing devices; and 4) a file-distribution module programmed to distribute the file to the one or more additional computing devices toward which the user gestured.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
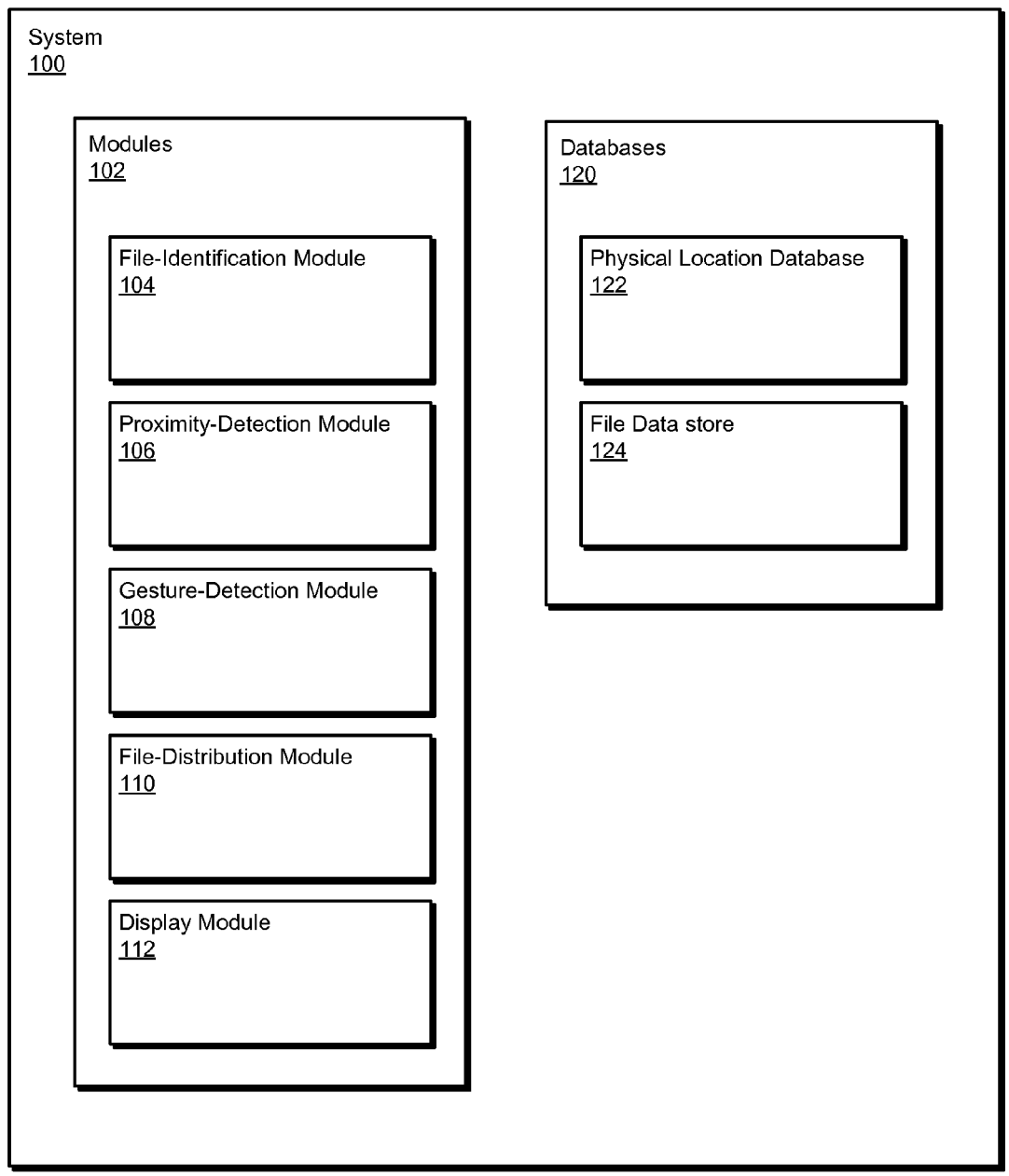
FIG. 1 is a block diagram of an exemplary system for gesture-based distribution of files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for gesture-based distribution of files. Embodiments of the instant disclosure may use location discovery technologies to discover physical locations of devices and may enable a natural human gesture to distribute files among such devices. For example, a person may flick their wrist toward an intended recipient device or flick their finger across a touch surface of a device in the direction of an intended recipient device, and in response a designated file may be sent to the recipient device.

Figure 2:
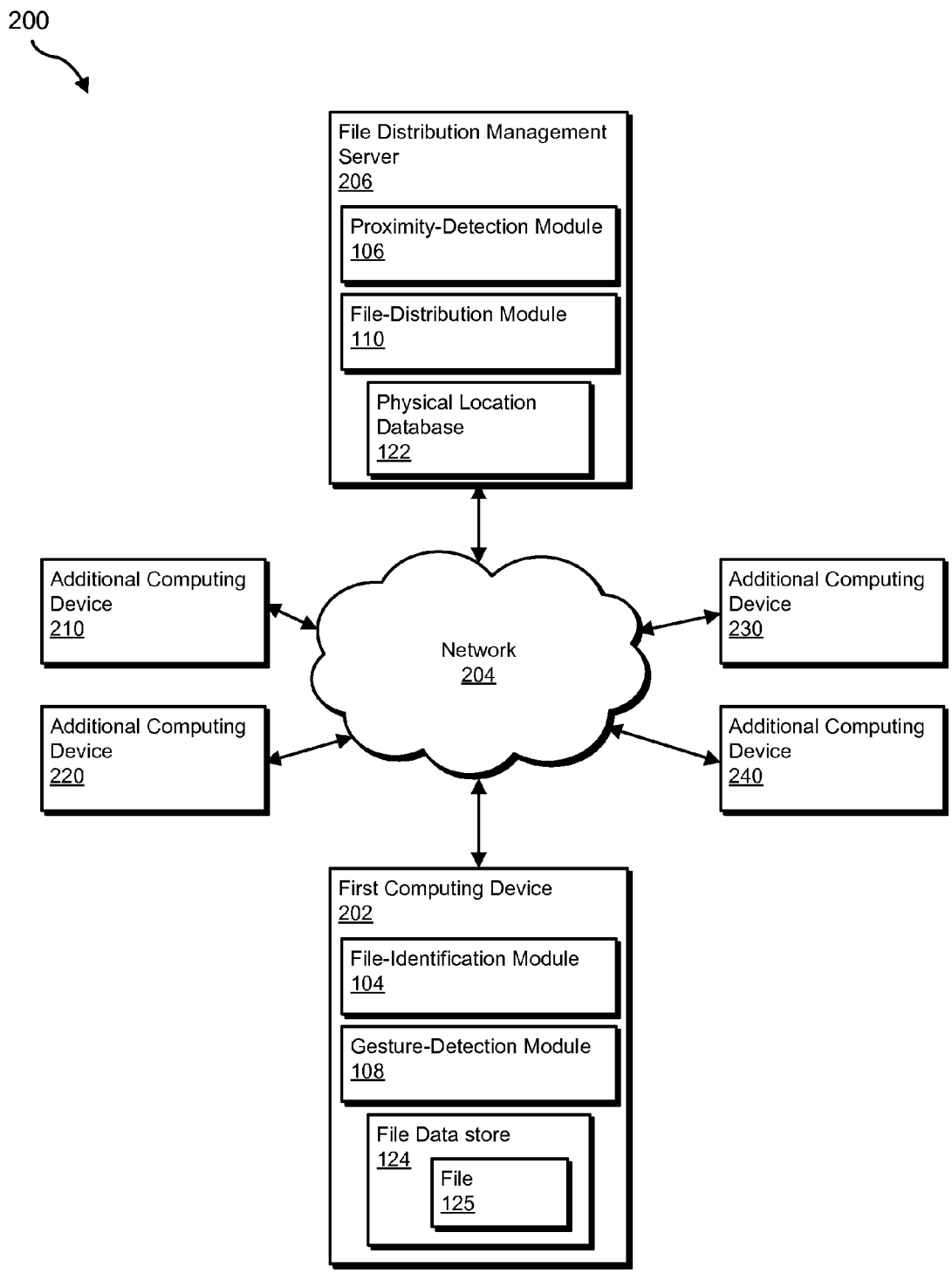
FIG. 2 is a block diagram of another exemplary system for gesture-based distribution of files.
Figure 4:
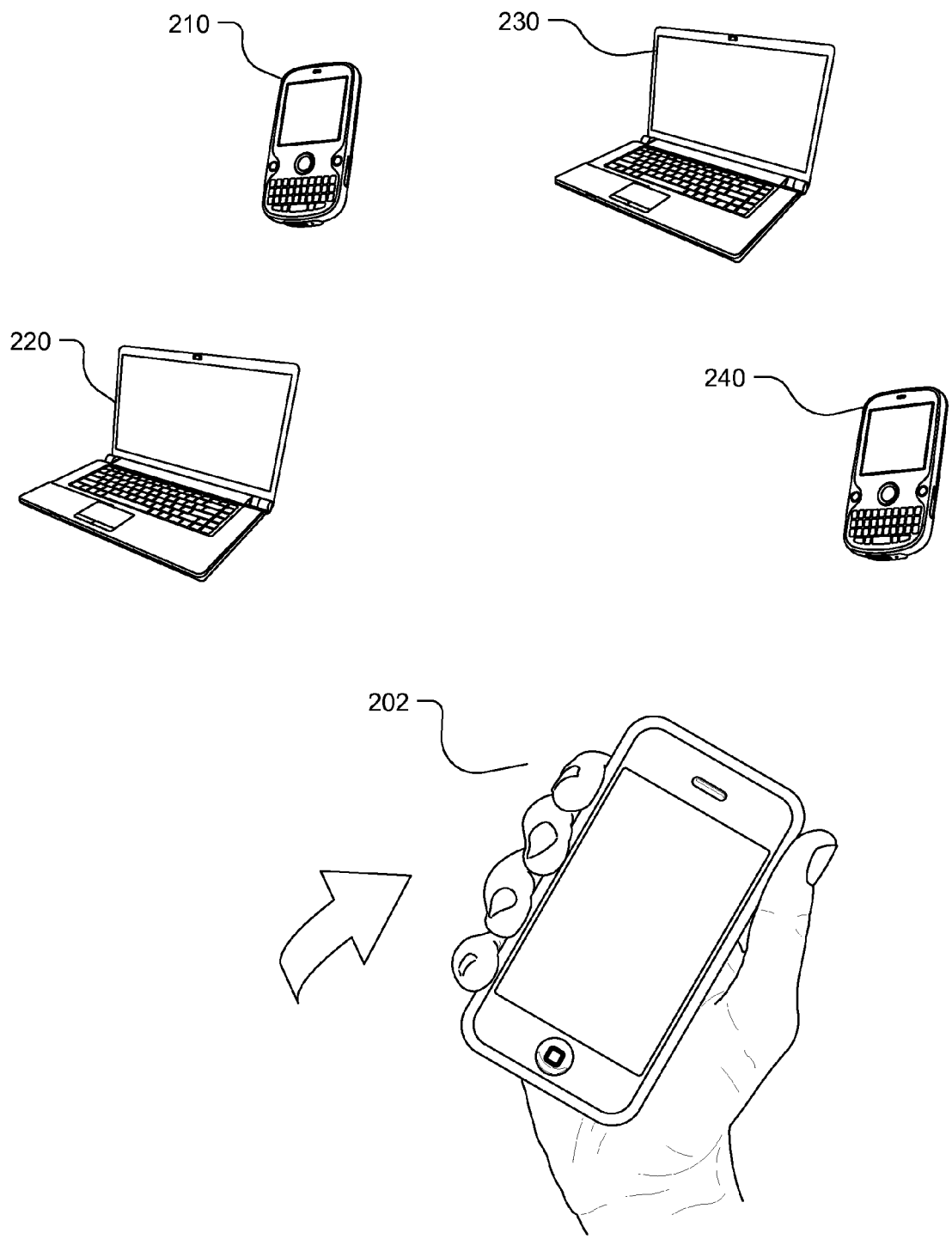
FIG. 4 is a diagram of an example of gesture-based distribution of a file from one computing device to another computing device.
Figure 5:
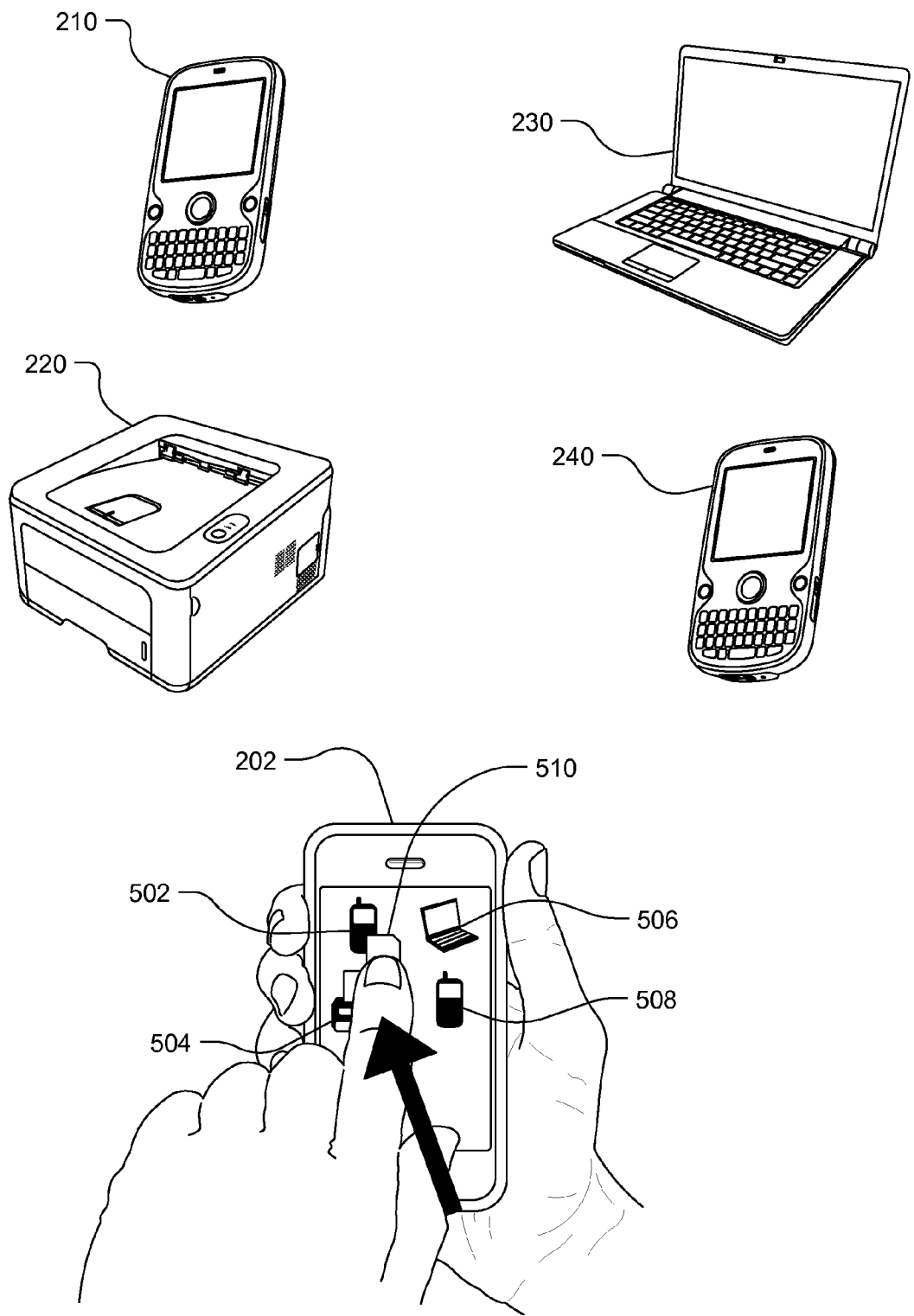
FIG. 5 is another diagram of an example of a gesture-based distribution of a file from one computing device to another computing device.
Figure 6:
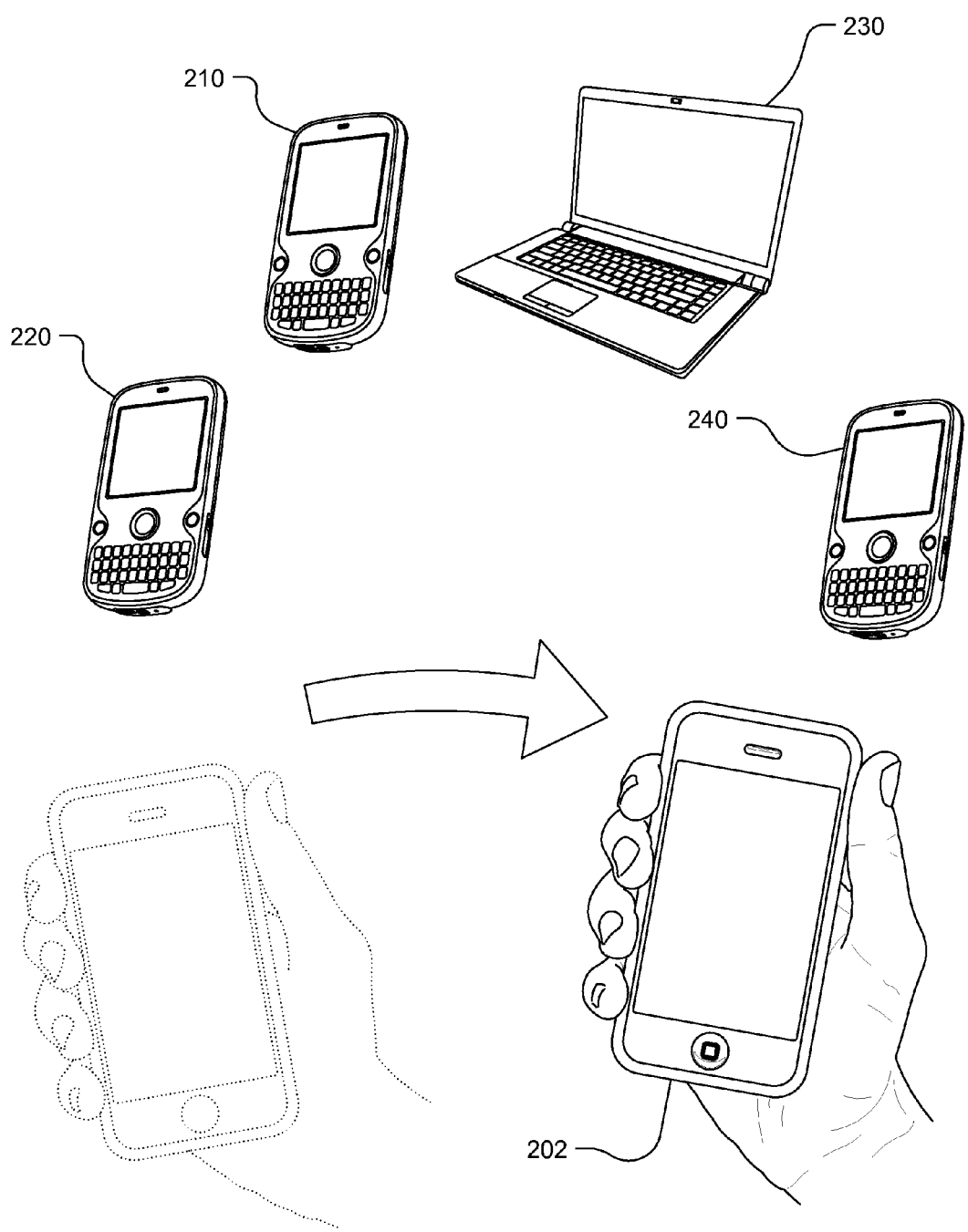
FIG. 6 is a diagram of an example of a gesture-based distribution of a file from one computing device to multiple computing devices.

The following will provide, with reference to FIGS. 1-2, detailed descriptions of exemplary systems for gesture-based distribution of files. Detailed descriptions of corresponding computer-implemented methods will also be provided in connection with FIG. 3. Examples of gestures that may be used for gesture-based file distributions are shown in FIGS. 4-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for gesture-based distribution of files. As illustrated in this figure, exemplary system 100 may include one or more modules 102 for performing one or more tasks. For example, and as will be explained in greater detail below, exemplary system 100 may include a file-identification module 104 programmed to receive, at a first computing device, input that identifies a file for gesture-based distribution to one or more other computing devices. Exemplary system 100 may also include a proximity-detection module 106 programmed to detect a plurality of additional computing devices in physical proximity of the first computing device. Proximity-detection module 106 may also be programmed to, for each computing device in the plurality of additional computing devices, determine a physical location of the additional computing device.

In addition, and as will be described in greater detail below, exemplary system 100 may include a gesture-detection module 108 programmed to detect, on the first computing device, a gesture of a user of the first computing device. Gesture-detection module 108 may also be programmed to determine, based on one or more of the physical locations of the additional computing devices, that the gesture of the user was directed toward one or more of the additional computing devices. System 100 may also include a file distribution module 110 programmed to distribute the file to the one or more additional computing devices toward which the user gestured. System 100 may further include a display module 112 programmed to display, on a Graphical User Interface ("GUI") of the first computing device, a graphical representation of each of the additional computing devices, where the graphical representations of the additional computing devices are displayed on the GUI in a configuration that represents the physical locations of the additional computing devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., first computing device 202 and/or file distribution management server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a physical location database 122 for storing location information that identifies the locations of computing devices. System 100 may also include a file data store 124 (e.g., a file system) for storing one or more files.

Databases 120 in FIG. 1 may represent a portion of one or more computing devices. For example, databases 120 may represent a portion of first computing device 202 in FIG. 2, file distribution management server 206 in FIG. 2, computing system 710 in FIG. 7, and/or portions of exemplary network architecture 800 in FIG. 8. Alternatively, databases 120 in FIG. 1 may represent one or more physically separate devices capable of being accessed by a computing device, such as file distribution management server 206 in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a first computing device 202, an additional computing device 210, an additional computing device 220, an additional computing device 230, an additional computing device 240, and a file distribution management server 206. A user of first computing device 202 may use gesture-based distribution to send one or more files to one or more of additional computing devices 210-240. To facilitate gesture-based distribution of files, first computing device 202 may include file-identification module 104, gesture-detection module 108, and file data store 124.

File data store 124 may include a file 125 that has been identified for gesture-based distribution. File distribution management server 206 may include proximity-detection module 106 to identify the locations of additional computing devices 210-240 and may store location information in physical location database 122. File distribution management server 206 may also include file-distribution module 110 for facilitating file distribution to additional computing devices 210-240.

While FIG. 2 shows proximity detection module 106, file-distribution module 110, and physical location database 122 within file distribution management server 206, one or more of proximity detection module 106, file-distribution module 110, and/or physical location database 122 may be located on first computing device 202 and/or any other suitable computing system. Similarly, while FIG. 2 shows file data store 124 with file 125 on first computing device 202, file data store 124 may be additionally or alternatively located on file distribution management server 206 and/or on any other suitable computing system.

First computing device 202 generally represents any type or form of computing device capable of reading computer-executable instructions. Examples of computing device 202 include, without limitation, laptops, cellular phones, personal digital assistants (PDAs), multimedia players, table computers, combinations of one or more of the same, exemplary computing system 710 in FIG. 7, or any other suitable computing device.

Similarly, additional computing devices 210-240 generally represent any type or form of computing device capable of reading computer-executable instructions. Examples of computing device 202 include, without limitation, laptops, desktops, servers, cellular phones, personal digital assistants (PDAs), multimedia players, embedded systems, tablet computers, printers, projectors, combinations of one or more of the same, exemplary computing system 710 in FIG. 7, or any other suitable computing device.

Server 206 generally represents any type or form of computing device that is capable of performing one or more file distribution management tasks. Examples of server 206 include, without limitation, application servers and database servers configured to provide various database services and/or run certain software applications. Server 206 may be implemented as a centralized location management server of an enterprise (e.g., a business, school, government office), as a server provided by a location services company, and/or in any other suitable context.

First computing device 202, file distribution management server 206, and additional computing devices 210-240 may communication over a network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections.

Figure 3:
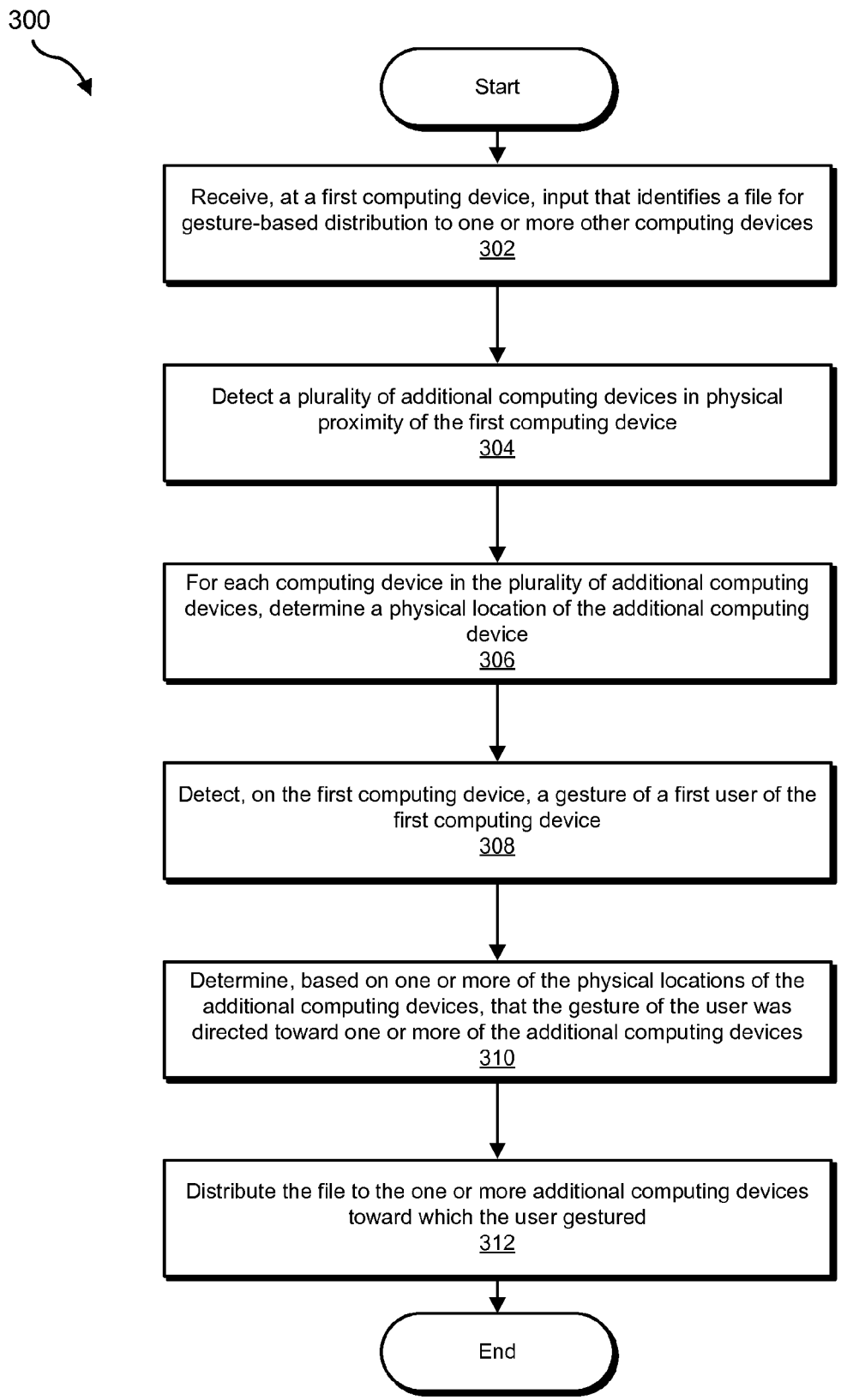
FIG. 3 is a flow diagram of an exemplary method for gesture-based distribution of files.

FIG. 3 is a flow diagram of an exemplary computer-implemented method 300 for gesture-based distribution of files. The steps shown in FIG. 3 may be performed by any computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may receive, at a first computing device, input that identifies a file for gesture-based distribution to one or more other computing devices. For example, file-identification module 104 on first computing device 202 of FIG. 2 may receive input that identifies file 125.

A file may be identified for gesture-based distribution in a variety of contexts and/or manners. For example, file-identification module 104 may be part of a gesture-based distribution software program used for distributing files to other computing devices based on a gesture of a user. A user may use such a program to navigate a file system (e.g., file data store 124) of first computing device 202 to locate and select file 125 for gesture-based distribution. A user may also provide any other suitable input to select file 125 for gesture-based distribution. For example, an icon representing file 125 may be displayed on a graphical-user interface of first computing device 202, and a user of first computing device 202 may select file 125 for distribution by flicking its icon toward another computing device. As another example, a user may provide a voice-command that identifies file 124.

In other embodiments, instead of being selected by user input, file 125 may be selected for gesture-based distribution by a local or remote application. For example, a user of additional computing device 210 may provide input to additional computing device 210 that requests file 125 from first computing device 202. A user of first computing device 202 may respond to the request by gesturing toward additional computing device 210 to trigger distribution of file 125 to additional computing device 210.

Any suitable type or form of file may be selected for gesture-based distribution according to embodiments of the instant disclosure. For example, executable files, document files, spreadsheet files, presentation files, email files, multimedia files (e.g., picture files, video files, audio files, etc), program files, settings files, and/or any other type of file may be selected for gesture-based distribution.

At step 304 in FIG. 3, one or more of the systems described herein may detect a plurality of additional computing devices in physical proximity of the first computing device. For example, proximity-detection module 106 running on file distribution management server 206 of FIG. 2 may detect additional computing device 210, additional computing device 220, additional computing device 230, and/or additional computing device 240 as being in physical proximity of first computing device 202.

As part of detecting computing devices in physical proximity of computing device 202, proximity-detection module 106 may first determine a physical location of computing device 202 using any of the location discovery technologies discussed here. Proximity-detection module 106 may then determine whether additional computing devices are in the proximity of the identified location of computing device 202.

Proximity-detection module 106 may detect computing devices in physical proximity of first computing device 202 in various contexts. For example, gesture-based file distribution software on first computing device 202 may contact file distribution management server 206 and request that file distribution management server 206 identify computing devices in physical proximity of first computing device 202. In other embodiments, file distribution management server 206 may proactively identify computing devices in physical proximity of computing device 202 without first receiving a request from first computing device 202. For example, if first computing device 202 and additional computing devices 210-240 are devices of users who will be present at a meeting during a scheduled time, file distribution management server 206 may be programmed to use proxy-detection module 106 identify computing devices present in the same room as first computing device 202 at the beginning of the meeting. File distribution management server 206 may also identify computing devices in proximity of first computing device 202 in response to any other suitable trigger.

As used herein, the phrase "physical proximity" generally refers to physical nearness of additional computing devices to a first computing device. For example, devices in physical proximity of a first computing device may be devices that are within a predefined distance (e.g., radius) of the first computing device. For example, devices within 20 feet of a first computing device may be said to be in physical proximity of the first computing device. Additionally or alternatively, additional computing devices may be in physical proximity of a first computing device if the additional computing devices are within a set of predefined physical boundaries that also enclose the first computing device (e.g., within a conference room, a lecture hall, a building, and/or any other enclosure or partial enclosure). In other embodiments, additional computing devices may be in physical proximity of a first computing device if the additional computing devices are within a wireless range of the first computing device (e.g., within range of a Wi-Fi network of the first computing device, within range of a Bluetooth network of the first computing device, within range of an infrared or Radio Frequency transmission of the first computing device, and/or within range of any other wireless technology of the first computing device).

Proximity-detection module 106 may detect computing devices in physical proximity of computing device 202 in a variety of ways. For example, proximity-detection module 106 may query a database (e.g., physical location database 122) in which locations of various computing devices may be stored and may determine whether or one or more of these devices are within physical proximity of first computing device 202. For example, proximity-detection module 106 may identify locations of additional computing devices 210-240 and may determine whether additional computing devices 210-240 are within a predefined distance of first computing device 202. Additionally or alternatively, proximity-detection module 106 may identify locations of additional computing devices 210-240 and may determine whether these devices are within the same physical enclosure (e.g., room) as first computing device 202 and/or whether these devices are within wireless range of first computing device 202.

At step 306, one or more of the systems described herein may, for each computing device in the plurality of additional computing devices, determine a physical location of the additional computing device. For example, proximity-detection module 106 may, for each of additional computing devices 210, 220, 230, and 240, determine a physical location of these computing devices. In some embodiments, step 306 may be performed at the same time step 304 is performed (e.g., determining a physical location of additional computing devices 210-240 may be a part of determining whether the computing devices are in physical proximity of first computing device 202). In some embodiments, step 306 may be performed before step 304 is performed.

As used herein, the phrase "physical location of a computing device" generally refers either an absolute or relative real-world physical location of the device. Absolute physical location information may include latitude-longitude information, Global Positioning System ("GPS") coordinates, altitude information (e.g., indicating the floor of a building where a device is located), and/or any other type of geolocation information that indicates a physical location of a computing device. Relative physical location information may indicate the location of a computing device relative to one or more other computing devices. For example, relative physical location may indicate that additional computing device 210 is located 10 feet to the southwest of first computing device 202.

Proximity-detection module 106 may use GPS technology, an altimeter, and/or other geolocation technologies to determine the locations of computing devices. Additionally or alternatively, proximity-detection module may use cell-phone triangulation, MAC addresses, security tokens, digital certificates, and/or various other technologies to identify and/or refine a physical location of a device. In some embodiments, proximity-detection module 106 may access a database that indicates where a device is likely to be at a given time of day to determine a physical location of a device.

At step 308, one or more of the systems described herein may detect, on the first computing device, a gesture of a user of the first computing device. For example, gesture-detection module 108 may detect, on first computing device 202, a gesture of a user of first computing device 202. One or more of a variety of different technologies may be used to detect a gesture of a user. For example a gesture may be detected when a user swipes a finger across a touch screen of first computing device 202, when a user presses one or more buttons on first computing device 202, when a user moves first computing device 202 (e.g., an accelerometer and/or magnetometer may be used detect movement of a device and or the direction (i.e., north, south, east, west, etc.) a device is pointed), and/or in any other suitable manner.

FIGS. 4-6 show three exemplary gestures that may be performed by a user to indicate where a user would like to distribute a file. FIGS. 4-6 each show additional computing devices 210-240 in physical proximity of first computing device 202. In FIG. 4, additional computing devices 210 and 240 are cell phones, and additional computing devices 220 and 230 are laptop computers. In this example, users of additional computing devices 210-240 may be sitting in a conference room listening to a presentation given by the user of first computing device 202. During the presentation, the user of first computing device 202 may want to share a document with the user of additional computing device 240 and may flick first computing device 202 toward additional computing device 240 to cause the document to be sent to additional computing device 240.

FIG. 5 shows another example of a gesture that may be used to distribute a file. As shown in FIG. 5, additional computing devices 210 and 240 may be cell phones, computing device 220 may be a printer, and computing device 230 may be a laptop computer. In one example, FIG. 5 may represent a classroom with the teacher holding first computing device 202 and students using computing devices 210, 230, and 240. Computing device 220 may be a printer located in the classroom.

FIG. 5 also shows that a Graphical User Interface ("GUI") of first computing device 202 may display icons of additional computing devices 210-240. For example, icon 502 may represent computing device 210, icon 504 may represent computing device 220, icon 506 may represent computing device 230, and icon 508 may represent computing device 240. As shown in FIG. 5, icons 502-508 may be displayed on the GUI of computing device 202 in a configuration that represents the actual physical positions of computing devices 210-240. The GUI of computing device 202 may also display an icon 510 that represents file 125 (i.e., a file intended for gesture-based distribution).

In the example shown in FIG. 5, a user may drag icon 510 representing file 125 and drop icon 510 on icon 502 to prompt distribution of file 125 to computing device 210. Alternatively, the user of computing device 202 may simply swipe the GUI of computing device in the direction of icon 502 and computing device 210 to cause file 125 to be distributed to computing device 210. While FIG. 5 shows the use of a finger-swipe gesture on a computing device that displays icons representing computing devices 210-240, such finger-swipe gestures may also be used to distribute files without icons or other graphical representations of computing devices 210-240 being displayed on computing device 202.

As noted, FIG. 5 shows that computing device 220 may be a printer. If a user of computing device 202 gestures toward printer 220, file 125 may be sent to printer 220 to be printed. As another example, computing device 220 may be a projector, and if a user of computing device 202 gestures toward the projector, a designated file (e.g., document, image, etc.) may be sent to the projector and displayed on the projector.

While the examples illustrated in FIGS. 4 and 5 show that a gesture is made in the direction of a single device, in other embodiments a user may gesture towards multiple devices. For example, a user may perform a finger flick or device flick gesture in the direction of two or more devices to cause a file to be distributed to two or more devices.

FIG. 6 illustrates an example of a gesture for distributing a file to multiple computing devices. As shown in FIG. 6, computing devices 210, 220, and 240 may be mobile phones and computing device 230 may be a laptop computer. A user of computing device 202 may desire to distribute a file to all of computing devices 210-240 and may perform a sweeping gesture with computing device 202 to indicate that a file should be distributed to all of computing devices 210-240. In some embodiments, a sweeping gesture may be used to indicate that all devices in the arch of the sweep should be sent a file. In other embodiments, a sweeping gesture (or any other suitable gesture) may be used to indicate that a file should be sent to all devices within physical proximity of computing device 202.

FIGS. 4-6 show examples that include four additional computing devices in physical proximity of first computing device 202. In other embodiments, any other number of computing devices may be detected to be in physical proximity of first computing device 202 and may be candidates to receive files in response to gestures of a user of computing device 202.

At step 310 in FIG. 3, one or more of the systems described herein may determine, based on one or more of the physical locations of the additional computing devices, that the gesture of the user was directed toward one or more of the additional computing devices. For example, gesture-detection module 108 may determine that a user of first computing device 202 gestured toward one or more of computing devices 210-240.

As previously discussed and shown in FIG. 5, a GUI of first computing device 202 may display representation of each of additional computing devices 210-240, and physical location information may be used to configure these graphical representations (e.g., icons) in a configuration that represents the actual physical locations of the additional computing devices. In such embodiments, determining that the gesture the user was directed towards one or more of the additional computing devices may include determining that the gesture dragged a physical representation of the file towards one or more graphical representations of the one or more additional computing devices.

Additionally or alternatively, gesture-detection module 108 may determine that the gesture of the user was directed towards one or more of the additional computing devices by determining that the user flicked a graphical interface of the first device in a direction of one or more of the additional computing devices. For example, gesture-detection module 108 may determine a trajectory of a flick of a user of computing device 202 and may use physical location information of the additional computing devices to identify one or more additional computing devices that are located in or near a path of the trajectory of the user's flick.

In other embodiments, gesture-detection module 108 may determine that the gesture of user was directed toward one or more of the additional computing devices by determining that the user moved the first device toward one or more of the additional computing devices. For example, gesture-detection module 108 may use physical location information of the additional computing devices to determine that the user flicked the first computing device from a position pointing away from one or more additional computing devices to a position pointing toward one or more additional computing devices.

At step 312 in FIG. 3, one or more of the systems described herein may distribute the file to the one or more additional computing devices toward which the user gestured. For example, file-distribution module 110 may distribute file 125 to one or more of additional computing devices 210-240 toward which the user of first computing device 202 gestured. The file may be distributed in various manners. For example, first computing device 202 may send the file to file distribution management server 206 and request that file distribution management server 206 distribute the file to the computing device or devices toward which the user gestured. In some embodiments, the file intended for distribution may already be stored on file distribution management server 206. In such embodiments, rather than sending the file to file-distribution management server 206, first computing device 202 may send identification information of the file (e.g., a file hash, a file signature, a file name, etc.) to file distribution management server 206, and file distribution management server 206 may use the identification information to locate the file and send it to the intended recipient(s). In fact, in embodiments where the file is stored on file distribution management server 206 (or any other remote location accessible to file distribution management server 206), first computing device 202 need not even store a copy of the file.

File distribution module 110 may use email, instant messaging, File Transfer Protocol ("FTP"), a shared drive on a network, a file sharing system with agents installed on additional computing devices 210-240, and/or any other suitable technology to distribute files. Also, while FIG. 2 shows file-distribution module 110 as being located on file distribution server 206, file-distribution module 110 may be located on first computing device 202. In such embodiments, first computing device 202 may distribute a file to recipient computing devices directly (i.e., without communicating with file distribution management server 206).

In some embodiments, file-distribution module 110 may identify a distribution policy that identifies at least one condition that must be met for gesture-based distribution of a file to be allowed. Before such a file can be distributed, file-distribution module 110 may determine whether the policy allows for the file to be distributed to the gestured computing devices. For example, a distribution policy may indicate that only certain files and/or file types may be distributed using gesture-based distribution. Alternatively, a distribution policy may indicate that certain files and/or file types are excluded from gesture-based distribution. Distribution policies may also designate one or more users that are permitted and/or excluded from sending and/or receiving files using gesture-based distribution.

In some embodiments, distribution policies may indicate that files may only be distributed within predefined physical boundaries (i.e., within a certain conference room or building) and/or within a predefined distance of a distributing device. As another example, a policy may indicate that a file may only distributed within certain altitude limits (e.g., a policy may indicate that file distribution in only allowed on floors 20 and 21 of an office building). Additionally or alternatively, distribution policies may identify time periods (e.g., days, times during a day, etc.) when gesture-based distribution is permitted or prohibited.

Figure 7:
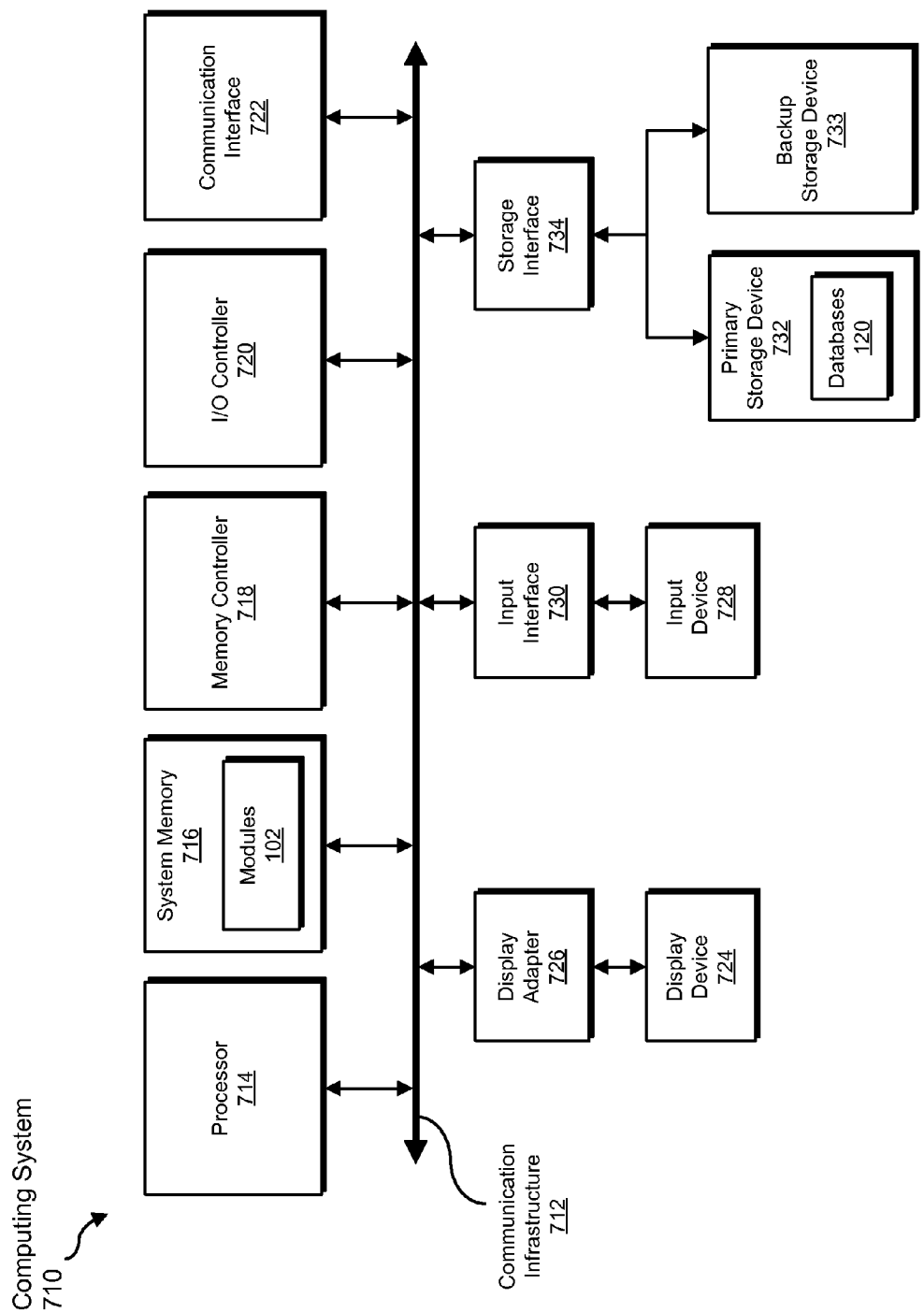
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, detecting, determining, distributing, and displaying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as receiving, detecting, determining, distributing, and displaying.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the receiving, detecting, determining, distributing, and displaying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, detecting, determining, distributing, and displaying steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, detecting, determining, distributing, and displaying steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the receiving, detecting, determining, distributing, and displaying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
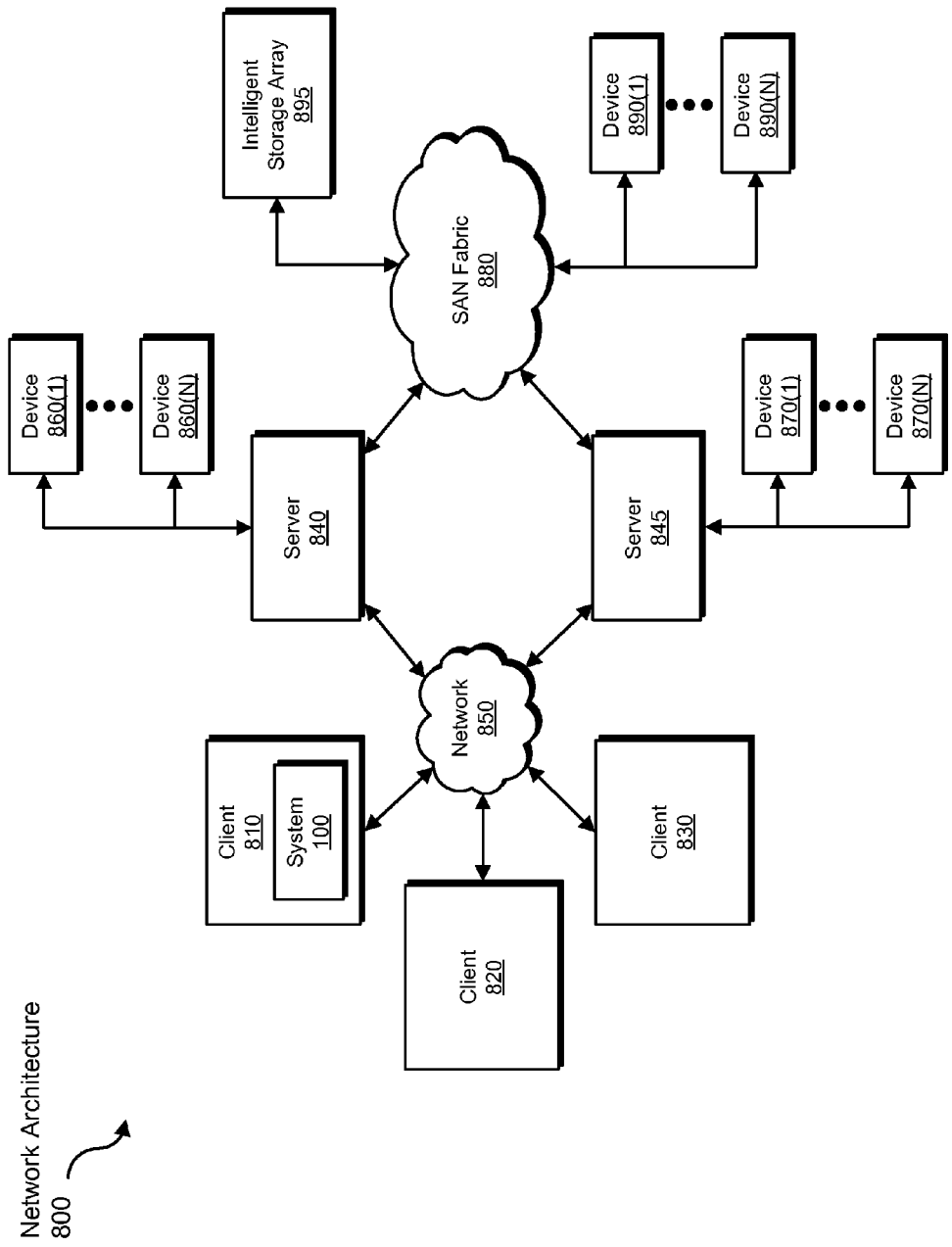
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, detecting, determining, distributing, and displaying steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for gesture-based distribution of files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a gesture of a user into a signal that prompts distribution of a file. Additionally or alternatively, one or more of the modules described herein may transform memory of a computing device by transmitting a file to the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for gesture-based distribution of files, at least a portion of the method being performed by a computing device comprising at least one processor, the method comprising:
  receiving, at a first computing device, input that identifies a file for gesture-based distribution to one or more other computing devices;
  detecting a plurality of additional computing devices in physical proximity of the first computing device;
  for each computing device in the plurality of additional computing devices, determining a physical location of the additional computing device;
  detecting, on the first computing device, a gesture of a user of the first computing device;
  determining, based on one or more of the physical locations of the additional computing devices, that the gesture of the user was directed toward one or more of the additional computing devices;
  identifying a distribution policy that indicates whether gesture-based distribution of the file is allowed;
  using the distribution policy to determine whether the file is allowed to be distributed using gestures;
  determining, based on the distribution policy, that gesture-based distribution of the file is allowed;
  in response to determining that gesture-based distribution of the file is allowed, distributing the file to the one or more additional computing devices toward which the user gestured, wherein the distribution policy indicates at least one of the following:
  that the file can only be distributed within predefined physical boundaries that designate a room within which the file can be distributed using gesture-based distribution,
  that the file can only be distributed within predefined altitude limits, that the file can only be distributed within a predetermined floor of a building.

2. The method of claim 1, wherein the distribution policy indicates that a predefined file type is excluded from gesture-based distribution.

3. The method of claim 1, wherein the distribution policy indicates that only a predefined type of file may be distributed using gesture-based distribution.

4. The method of claim 1, wherein the distribution policy designates at least one user that is prohibited from sending files using gesture-based distribution.

5. The method of claim 1, wherein the distribution policy designates at least one user that is prohibited from receiving files using gesture-based distribution.

6. The method of claim 1, wherein the distribution policy designates at least one user that is permitted to send files using gesture-based distribution.

7. The method of claim 1, wherein the distribution policy designates at least one user that is permitted to receive files using gesture-based distribution.

8. The method of claim 1, wherein the gesture comprises a sweeping gesture.

9. The method of claim 8, wherein the sweeping gesture indicates that all computing devices within an arch of the sweeping gesture should be sent the file.

10. The method of claim 1, wherein the distribution policy identifies a time period for which gesture-based distribution is permitted.

11. The method of claim 1, wherein the distribution policy indicates that the file may only be distributed by gestured-based distribution to devices within a predefined distance of the first computing device.

12. A system for gesture-based distribution of files, the system comprising:
a file-identification module programmed to receive, at a first computing device, input that identifies a file for gesture-based distribution to one or more other computing devices;
a proximity-detection module programmed to:
detect a plurality of additional computing devices in physical proximity of the first computing device;
for each computing device in the plurality of additional computing devices, determine a physical location of the additional computing device;
a gesture-detection module programmed to:
detect, on the first computing device, a gesture of a user of the first computing device;
determine, based on one or more of the physical locations of the additional computing devices, that the gesture of the user was directed toward one or more of the additional computing devices;
a file-distribution module programmed to:
identify a distribution policy that indicates whether gesture-based distribution of the file is allowed;
use the distribution policy to determine whether the file is allowed to be distributed using gestures;
determine, based on the distribution policy, that gesture-based distribution of the file is allowed;
in response to determining that gesture-based distribution of the file is allowed, distribute the file to the one or more additional computing devices toward which the user gestured;
one or more processors configured to execute the file-identification module, the proximity-detection module, the gesture-detection module, and the file-distribution module, wherein the distribution policy indicates at least one of the following:

that the file can only be distributed within predefined physical boundaries that designate a room within which the file can be distributed using gesture-based distribution,
that the file can only be distributed within predefined altitude limits,
that the file can only be distributed within a predetermined floor of a building.

13. The system of claim 12, wherein the proximity-detection module is programmed to detect the plurality of additional computing devices in physical proximity of the first computing device by identifying computing devices present in the same room as the first computing device at the beginning of a meeting.

14. The system of claim 12, wherein:
the one or more additional computing devices toward which the user gestured comprises a printer;
the file-distribution module is programmed to distribute the file to the one or more additional computing devices toward which the user gestured by causing the printer to print the file.

15. The system of claim 12, wherein:
the one or more additional computing devices toward which the user gestured comprises a projector;
the file-distribution module is programmed to distribute the file to the one or more additional computing devices toward which the user gestured by causing the file to be sent to the projector and displayed by the projector.

16. The system of claim 12, wherein:
the system further comprises a file-distribution management server that is remote from the first computing device;
the file-distribution module is programmed to distribute the file to the one or more additional computing devices toward which the user gestured by sending a signature of the file to the file-distribution management server;
the file-distribution management server is programmed to use the signature to locate the file and transmit the file to the one or more additional computing devices toward which the user gestured.

17. The system of claim 12, wherein:
the system further comprises a file-distribution management server that is remote from the first computing device;
the file-distribution module is programmed to distribute the file to the one or more additional computing devices toward which the user gestured by sending the file to the file-distribution management server;
the file-distribution management server is programmed to transmit the file to the one or more additional computing devices toward which the user gestured.

18. The system of claim 12, wherein the distribution policy identifies one or more predefined files that are allowed to be distributed using gesture-based distribution;
the one or more predefined files that are allowed to be distributed using gestured-based distribution comprise the file.

19. The system of claim 12, wherein the proximity-detection module is programmed to detect the plurality of additional computing devices in physical proximity of the first computing device by querying a location database to determine the physical locations of the plurality of additional computing devices.

20. A non-transitory computer-readable medium comprising one or more computer-executable instructions that, when executed by at least one processor of a computing system, cause the computing system to:

receive, at a first computing device, input that identifies a file for gesture-based distribution to one or more other computing devices;

detect a plurality of additional computing devices in physical proximity of the first computing device;

for each computing device in the plurality of additional computing devices, determine a physical location of the additional computing device;

detect, on the first computing device, a gesture of a user of the first computing device;

determine, based on one or more of the physical locations of the additional computing devices, that the gesture of the user was directed toward one or more of the additional computing devices;

identify a distribution policy that indicates whether gesture-based distribution of the file is allowed;

use the distribution policy to determine whether the file is allowed to be distributed using gestures;

determine, based on the distribution policy, that gesture-based distribution of the file is allowed;

in response to determining that gesture-based distribution of the file is allowed, distribute the file to the one or more additional computing devices toward which the user gestured, wherein the distribution policy indicates at least one of the following:

that the file can only be distributed within predefined physical boundaries that designate a room within which the file can be distributed using gesture-based distribution, that the file can only be distributed within predefined altitude limits, that the file can only be distributed within a predetermined floor of a building.

\* \* \* \* \*